United States Patent [19]

Ikeda et al.

[11] Patent Number: 4,867,650
[45] Date of Patent: Sep. 19, 1989

[54] RECIPROCATORY PISTON TYPE COMPRESSOR WITH NOISE FREE SUCTION VALVE MECHANISM

[75] Inventors: Hayato Ikeda; Hideo Mori; Toshinari Mizutani, all of Kariya, Japan

[73] Assignee: Kabushiki Kaisha Toyoda Jidoshokki Seisakusho, Aichi, Japan

[21] Appl. No.: 181,234

[22] Filed: Apr. 13, 1988

[30] Foreign Application Priority Data

Apr. 16, 1987 [JP] Japan .......................... 62-056730[U]

[51] Int. Cl.⁴ .......................... F04B 21/02; F04B 27/08
[52] U.S. Cl. .................................... 417/269; 417/571; 137/512.15; 137/856
[58] Field of Search ............... 417/269, 559, 567, 569, 417/571; 137/512.15, 855, 856, 857, 858

[56] References Cited

U.S. PATENT DOCUMENTS

| 2,908,287 | 10/1959 | Augustin | 417/571 X |
| 3,998,571 | 12/1976 | Falke | 417/569 |
| 4,193,424 | 3/1980 | Hrabal | 137/855 |
| 4,749,340 | 6/1988 | Ikeda et al. | 417/569 X |

FOREIGN PATENT DOCUMENTS

| 61-234283 | 10/1986 | Japan | 417/571 |
| 2171405 | 8/1986 | United Kingdom | 417/569 |

*Primary Examiner*—Carlton R. Croyle
*Assistant Examiner*—Eugene L. Szczecina, Jr.
*Attorney, Agent, or Firm*—Burgess, Ryan & Wayne

[57] ABSTRACT

A reciprocatory piston type compressor having a cylinder block in which a plurality of compression chambers permit a plurality of reciprocatory pistons to be reciprocated so as to compress a refrigerant gas drawn from a suction chamber formed in an end housing into the compression chambers through suction ports of a valve plate, opened and closed by a suction valve mechanism with a plurality of resilient radial suction valves having a free end thereof, respectively, and surrounded by cutoff slots formed in a suction valve sheet, and to discharge the compressed refrigerant gas from the compression chambers into a discharge chamber formed in the end housing through discharge ports of the valve plate, opened and closed by resilient discharge valves. Each of the cutoff slots of the suction valve sheet has a part thereof adjacent to the free end of each suction valve which is radially widened to retain a predetermined amount of the compressed gas by which the suction valves are smoothly separated from the valve plate toward the open position thereof and rest on the walls of radial recesses formed in the end of the cylinder block during the suction stroke of the compressor.

4 Claims, 3 Drawing Sheets

RECIPROCATORY PISTON TYPE COMPRESSOR WITH NOISE FREE SUCTION VALVE MECHANISM

BACKGROUND OF THE INVENTION

1. Field of the Invention

The present invention relates to a reciprocatory piston type compressor with an improved suction valve mechanism, and used in a unit for air-conditioning a vehicle passenger compartment, and more particularly, to a reciprocatory piston type compressor with a suction valve mechanism free from the irregular vibration which is a cause of noise in the compressor and pulsation in the flow of a suction refrigerant gas.

2. Description of the Related Art

Many piston type compressors, such as a swash plate type compressor and a wobble are known. For example, U.S. Pat. No. 4,691,526 to Kobayashi et al discloses an air-conditioning unit for a vehicle employing a multi-cylinder swash plate type compressor with double-acting reciprocatory pistons and front and rear suction valve mechanisms having a valve plate for defining suction and discharge ports, and a valve sheet defining therein resilient reed valves, respectively. U.S. Pat. No. 4,687,419 to Suzuki et al discloses a multi-cylinder variable displacement wobble plate type compressor with double-acting reciprocatory pistons and a suction valve mechanism similar to the suction valve mechanism of the swash plate type compressor of U.S. Pat. No. 4,691,526. Each of the known multi-cylinder swash plate type and wobble plate type compressors of U.S. Nos. 4,691,526 and 4,687,419 includes a cylinder block having a plurality of cylinder bores serving as compression chambers to permit double-acting pistons to be reciprocated therein to compress a refrigerant gas. Both ends of the cylinder block of U.S. Nos. 4,691,526 are closed by front and rear housings, via valve plates, so that suction and discharge chambers are formed in each of the housings. The suction chambers are fluidly communicated with the compression chambers through a suction valve mechanism including suction ports formed in the valve plates, and suction valves arranged on the inner side of the valve plates, and the discharge chambers are fluidly communicated with the compression chambers through a discharge valve mechanism including discharge ports formed in the same valve plates, and discharge valves arranged on the outer side of the valve plates. The valve plates are also formed with inlet ports, to permit a refrigerant gas returning from the outer air-conditioning circuit to flow into the suction chambers, and outlet ports to permit a compressed refrigerant gas to flow from the discharge chambers into the air-conditioning circuit. Similarly, both ends of the cylinder block of U.S. Pat. No. 4,687,419 are closed by front and rear housings. However, only one of the housings (rear housing) is attached to one end of the cylinder block, via a valve plate, so that suction and discharge chambers are formed in the rear housing. The suction and discharge chambers are fluidly communicated with the compression chambers of the cylinder block through suction and discharge valve mechanisms similar to those of U.S. Nos. 4,691,526.

A typical construction and arrangement of the above-mentioned conventional suction valve mechanism is illustrated in FIGS. 6 through 9.

FIG. 6 shows one of plurality of cylinder bores 1b of a cylinder block 1 of a swash plate type or wobble plate type compressor. The cylinder bores 1b are equiangularly arranged around the center of the cylinder block 1, and receive a corresponding number of pistons therein (not illustrated in FIG. 6) which are reciprocated in response to the rotation of a swash plate or wobble plate as illustrated in U.S. Pat. No. 4,691,526 or 4,687,419. The cylinder block 1 has one end 1a to which a suction valve sheet 2 made of, e.g., a resilient thin metallic sheet, and a thick valve plate 3 are firmly attached, and closed by a housing 12. The housing 12 defines therein an inner discharge chamber 12A and on outer suction chamber 12B. The valve plate 3 is provided with a plurality of equiangularly arranged suction ports 4 for communicating between the suction chamber 12B and the plurality of cylinder bores 1b, and a plurality of equiangularly arranged discharge ports 5 for communicating between the plurality of cylinder bores 1b and the discharge chamber 12A. As illustrated in FIG. 7, the suction valve sheet 2 has a plurality of resilient suction valves 2a to open and sealingly close the suction ports 4. Each of the plurality of resilient suction valves 2a of the suction valve sheet 2 is formed as a reed valve radially extending from a central portion to an outer portion of the suction valve sheet 2, and surrounded by a pair of cutaway portions 7 on opposite sides of a wide base portion of the suction valve 2a and a cutoff slot 11 extending between the pair of cutaway portions 7 along both slanting sides 2ab and a free end 2aA of the suction valve 2a. The suction valve 2a has an aperture 2b formed in the base portion thereof in registration with the discharge port 5 of the valve plate 3. The free end 2aA of each resilient suction valve 2a is resiliently bent and moved away and separated from the valve plate 3 under a pressure difference between pressures within the cylinder bore 1b and the suction chamber 12B during the suction stroke of the corresponding reciprocating piston in the cylinder bore 1b. In the separated state, the free end 2aA of the suction valve 2a is abutted against a wall 6a of a radial recess 6 formed in an end 1a of the cylinder block 1 at a portion disposed adjacent to the end of the cylinder bore 1b, as illustrated in FIG. 9.

In FIG. 6, a plurality of discharge valves 8 (one of which is shown in FIGS. 6, 8 and 9, respectively) and the corresponding number of valve retainers 9 are arranged in the discharge chamber 12A of the housing 12 and secured to the valve plate 3 on the side thereof confronting the discharge chamber 12A by a screw bolt 10. The discharge valves 8 are arranged so as to open and close the corresponding discharge ports 5 of the valve plate, and are resiliently opened by the pressure of the compressed refrigerant gas during the discharge stroke of the related reciprocatory pistons in the cylinder bores 1b. The amount of the opening of each discharge valve 8 is controlled by the associated retainer 9.

At this stage, it should be understood that the cutoff slot 11 separating the free end 2aA of each resilient suction valve 2a from an edge 2c of the suction valve sheet 2 is very narrow and has a width $L_1$ as best illustrated in FIG. 7. Therefore, when the operation of the piston type compressor starts, i.e., when each reciprocatory piston reciprocates in each cylinder bore 1b, the suction, compression and discharge strokes of the piston are repeatedly carried out in each cylinder bore 1b. When the discharge stroke is switched to the subsequent suction stroke, each resilient suction valve 2a of the suction valve sheet 2 is bent to an open position thereof by the pressure difference between a reduced pressure within the cylinder bore 1b and a pressure prevailing in the suction chamber 12B of the housing 12 as illustrated in FIG. 9. Thus, the corresponding suction port 4 of the valve plate 3 is opened to allow the refrigerant gas in the suction chamber 12B to be drawn into the cylinder bore 1b.

When the suction stroke is switched to the compression stroke, each resilient suction valve 2a of the suction valve sheet 2 resiliently returns to the closed position, to close the corresponding suction port 4 of the valve plate 3 under a high pressure of the compressed refrigerant gas, and the associated discharge valve 8 is moved to the open position to open the discharge port 5 of the valve plate 3 by the high pressure of the compressed refrigerant gas.

With the above-described construction and operation of the conventional suction valve mechanism of the reciprocatory piston type compressor, the cutoff slot 11 of the suction valve sheet 2, especially a part of the cutoff slot 11 located adjacent to the free end 2aA of each suction valve 2a, is made narrow to prevent a reduction in the compression efficiency of the compressor. Therefore, when the compressor is driven by a vehicle engine at a low rotating speed, such as an idling speed, the suction pressure of the compressor is maintained at a low level. Thus, the suction valves 2a of the suction valve sheet 2 cannot be smoothly bent toward the open position from the closed position in contact with the face of the valve plate 3, due to a lack of pressure difference between pressures in the suction chamber 12B and respective cylinder bores 1b. Further, an oil mist attached to the contacting faces of the suction valves 2a and the valve plate 3 prevents an immediate separation of the suction valves 2a from the face of the valve plate 3 at an initial stage of the suction stroke, as best illustrated in FIG. 8, and with the proceeding of the suction stroke, the suction valves 2a are abruptly separated from the contacting face of the valve plate 3. As a result, the free ends 2aA of the suction valves 2a hit hard against the corresponding walls 6a of the radial recesses 6 of the cylinder block 1, to produce a loud noise. The loud noise further produces an unpleasant resonance which is transmitted through the cylinder block 1.

On the other hand, regardless of the proceeding of the suction stroke, if the free ends 2aA of respective suction valves 2a do not bend enough to hit the corresponding walls 6a of the radial recesses 6 of the cylinder block 1, due to a lack of suction pressure for attracting the free ends 2aA toward the walls 6a of the radial recesses 6, the suction valves 2a carry out a self vibration between the closed and open positions, due to the balance of the suction pressure and the resiliency of the suction valves 2a per se, and thus a smooth suction of the refrigerant gas from the suction chamber 12B to the cylinder bores 1b is prevented.

In addition, when the vibration of the suction valves 2a occurs during the suction stroke of the reciprocatory pistons of the compressor, a large pulsation appears in the suction stream of the refrigerant gas, causing noise as well as a reduction in the compression performance of the compressor.

SUMMARY OF THE INVENTION

An object of the present invention is to eliminate the above-mentioned defects encountered by the conventional suction valve mechanism of a reciprocatory piston type compressor.

Another object of the present invention is to provide a reciprocatory piston type compressor adapted for use in an air-conditioning circuit of an engine vehicle, capable of exhibiting a reliable performance during a wide range of engine speeds including an engine idling speed.

A further object of the present invention is to provide a reciprocatory piston type compressor to be used for forming a quiet air-conditioning circuit of a vehicle.

In accordance with the present invention, there is provided a reciprocatory piston type compressor for compressing a refrigerant gas which comprises:

a cylinder block having therein a plurality of axial cylinder bores formed as compression chambers for permitting reciprocatory pistons to carry out a suction and a compression of the refrigerant gas therein;

at least a housing closing an axial end of the cylinder block for forming a suction chamber receiving therein the refrigerant gas before compression and a discharge chamber for receiving the refrigerant gas after compression;

a valve plate arranged between the axial end of the cylinder block and the housing and having an inlet port for introducing the refrigerant gas to be compressed from an outer air-conditioning circuit into the suction chamber, a plurality of suction ports for fluidly communicating between the suction chamber and the compression chambers, an outlet port for discharging the compressed refrigerant gas from the discharging chamber toward the outer air-conditioning circuit, and a plurality of discharge ports for fluidly communicating between the discharge chamber and the compression chambers;

a suction valve sheet arranged between one end face of the valve plate and the axial end of the cylinder block and having a central fixed portion and a plurality of suction valves formed as resilient reed valves radially extending from the central fixed portion and adapted to perform a resilient movement with respect to the central fixed portion between an open position spaced from the valve plate for opening a corresponding one of the suction ports and a closed position in contact with the valve plate for closing the corresponding suction port in response to suction and compression motions of the reciprocatory pistons, each of the suction valves having substantially radially extending opposite sides and a free end which are surrounded by a continuously extending cutoff slot formed in the suction valve sheet, the free end of each suction valve being allowed to rest on a bottom wall of a radial recess formed in the axial end of the cylinder block at a position adjacent to an end of the corresponding cylinder bore when the suction valve is in the open position;

a discharge valve sheet arranged on the other end face of the valve plate and having a base support plate fixed in close contact with said other end face of the valve plate and a plurality of resilient discharge valves adapted to perform a resilient movement between a closed position in contact with the valve plate for closing a corresponding one of said discharge ports and an open position spaced from the valve plate for opening the corresponding discharge port in response to the suction and compression motions of the reciprocatory pistons; and, a plurality of means for retaining a predetermined amount of the compressed refrigerant gas at positions adjacent to respective free ends of the suction valves of the suction valve sheet, the plurality of means for retaining a predetermined amount of the compressed refrigerant gas being always communicated with the corresponding cylinder bores via the radial recesses of the cylinder block thereby to permit the predetermined amount of refrigerant gas to flow into the cylinder bores and promote the resilient movement of the suction valves toward said open position during the suction motion of the corresponding reciprocatory pistons.

Preferably, the plurality of means for retaining a predetermined amount of the compressed refrigerant gas at positions adjacent to respective free ends of the suction valves comprise a plurality of cutaway portions located adjacent to the respective free ends of the suction valves and formed by widening a part of each of the cutoff slots of the suction valve sheet, each cutaway portion being radially wider than a radial length of each radial recess.

BRIEF DESCRIPTION OF THE DRAWING

The above and other objects, features and advantages of the present invention will become apparent from the ensuing description of the embodiments illustrated in the accompanying drawings wherein.

DESCRIPTION OF THE PREFERRED EMBODIMENTS

Figure 1:
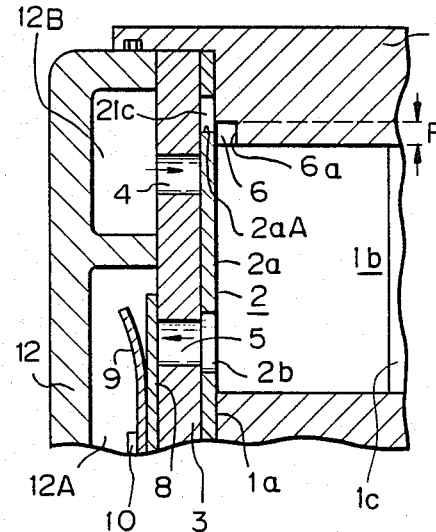
FIG. 1 is a partial cross-sectional view of a reciprocatory piston type compressor according to an embodiment of the present invention.

With regard to the embodiments of FIGS. 1 through 5, it should be understood that the same or like elements and portions of a reciprocatory piston type compressor as those of the prior art illustrated in FIGS. 6 through 9 are designated by the same reference numerals.

Figure 2:
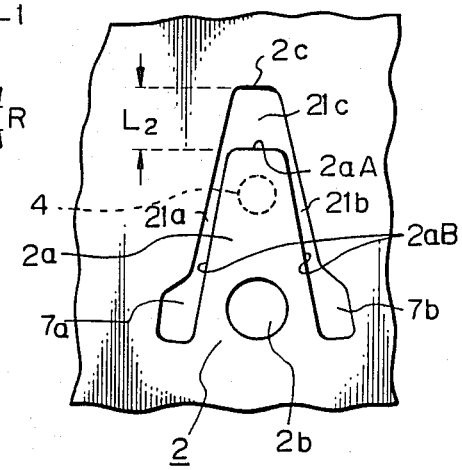
FIG. 2 is a partial side view of a valve sheet accommodated in the compressor of FIG. 1, illustrating one of resilient suction valves surrounded by cutoff slot and cutaway portions.
Figure 3:
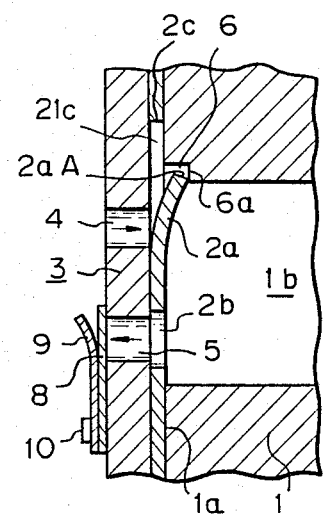
FIG. 3 is a cross-sectional view of a part of the compressor of FIG. 1, illustrating an operation stage in which one of the suction valves is bent to an open position thereof.
Figure 4:
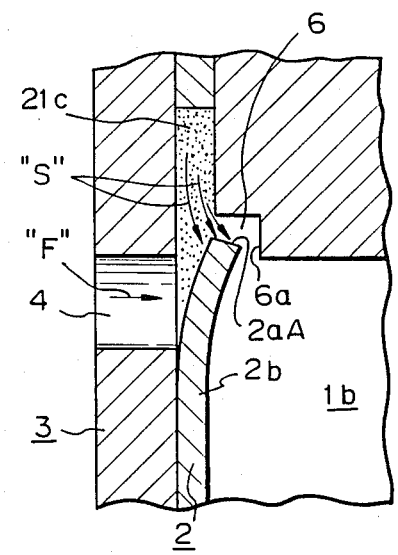
FIG. 4 is an enlarged cross-sectional view of a part of the compressor of FIG. 1, illustrating one of the resilient suction valves at a start of the opening motion.

Referring to FIGS. 1 through 4, a reciprocatory piston type compressor has a circular cylinder block 1 in which a plurality of axial cylinder bores 1b (only one cylinder bore 1b is shown) are equiangularly arranged around the center of the cylinder block 1. Respective axial cylinder bores 1b receive therein reciprocatory pistons 1c to draw in and compress the refrigerant gas in the compression chambers of the cylinder bores 1b. The reciprocatory motion of the pistons 1c is effected by a drive mechanism (not shown), such as known swash plate and wobble plate mechanisms. One end of the circular cylinder block 1 is counterbored to provide an inner end face 1a to which a circular suction valve sheet 2 and a circular valve plate 3 are firmly fitted. The counter-bored end of the cylinder block 1b is sealingly closed by a cap-like housing 12 having therein an inner discharge chamber 12A for the refrigerant gas after compression and an outer suction chamber 12B for the refrigerant gas before compression. The discharge and suction chambers 12A and 12B are separated from one another by a partition wall 12C. The valve plate 3 has suction and discharge ports 4 and 5 in a position in registration with each of the plurality of cylinder bore 1b of the cylinder block 1. The suction and discharge ports 4 and 5 are spaced from one another in a radial direction with respect to the center of the valve plate 3. Each suction port 4 is provided for communicating between the corresponding cylinder bore 1b and the suction chamber 12B of the housing 12, and each discharge port 5 is provided for communicating between the corresponding cylinder bore 1b and the discharge chamber 12A of the housing 12. The suction valve sheet 2 made of a resilient metallic sheet, such as a stainless steel sheet, has a central portion firmly fixed between the valve 3 and the inner end 1a of the cylinder block 1 and a plurality of suction valves 2a formed therein so as to radially extend from the central portion and normally close the plurality of suction ports 4 of the valve plate 3 by the resiliency thereof. Each of the suction valves 2a of the suction valve sheet 2 has a free end 2aA at a radial front end which is moved away and separated from the face of the valve plate 3 during each suction stroke of the corresponding reciprocatory piston 1c and rests on a wall 6a of a radial recess 6 formed in the inner end 1a of the cylinder block 1, as illustrated in FIG. 3. The radial recess 6 of the cylinder block 1 is formed so as to limit the amount of bending of the corresponding suction valve 2a during the suction stroke and prevent leakage of the compressed gas during the compression and discharge stroke of the piston 1c. Therefore, the radial recess 6 has a predetermined axial depth and a predetermined radial width "R" as illustrated in FIG. 1.

The compressor of FIG. 1 also has a discharge valve mechanism comprising a plurality of discharge valves 8 and a plurality of retainer plates 9 which are arranged in the discharge chamber 12A and fixed by a screw bolt 10 to the valve plate 3 on the face thereof opposite to that with which the suction valve sheet 2 is in contact. The plurality of the discharge valves 8 are provided for openably closing the discharge ports 5 of the valve plate 3.

As best illustrated in FIG. 2, each of the suction valves 2a of the suction valve sheet 2 has the shape of a convergent reed valve having opposite sides 2a B connected to the free end 2aA in the form of a straight end. A bore 2b is formed at a base portion of the suction valve 2a in registration with the corresponding discharge port 5 of the valve plate 3. The suction valve 2a is surrounded by a pair of cutaway portions 7a and 7b disposed on the side of the base portion thereof, cutoff slots 21a and 21b arranged on the sides of the opposite sides 2aB, and a cutaway 21c arranged between the free end 2a A and an edge 2c of the suction valve sheet 2. The arrangement of these cutaways 7a, 7b, and 21c and cutoffs 21a and 21b permits the resilient opening and closing movements of each suction valve 2a in response to the reciprocatory movement of the corresponding piston 1c.

At this stage, it should be noted that, in the present embodiment, the cutaway 21c between the free end 2aA of each suction valve 2a and the edge 2c of the suction valve sheet 2 is formed so that the width $L_2$ (typically 3 mm) of the cutaway 21c measured in the radial direction is made larger than the afore-mentioned radial width "R" of the corresponding radial recess 6 of the cylinder block 1. That is, in comparison with the cutoff 11 of the suction valve sheet 2 of the prior art of FIG. 7, the cutaway 21c of the present embodiment is intentionally widened.

Each of the cutaways 21c of the suction valve sheet 2 of the present embodiment is formed as a substantially triangular opening, as best illustrated in FIG. 2. However, the form of the cutaway 21c may be modified as shown by an outwardly curved and elongated opening 21c' illustrated in FIG. 5.

It should be appreciate that the provision of the cutaway 21c disposed adjacent to the free end 2a A of each suction valve 2a enables the defining of a cavity communicated with the cylinder bore 1b via the radial recess 6 of the cylinder block 1, as understood from the illustration of FIG. 1.

The above-mentioned cavity enables a predetermined amount of the compressed refrigerant gas to be retained at the end of the compression stroke of the piston 1c.

The operation of the suction valve mechanism of the reciprocatory piston type compressor according to the present invention will be described hereinbelow, wherein attention is directed to one of the plurality of the suction valves 2a of the suction valve sheet 2 and the associated compressor elements illustrated in FIGS. 1 through 4.

When the compressor is brought into an operation by the rotation of the piston drive mechanism, such as a swash plate mechanism, the piston 1c is reciprocated to repeatedly carry out the suction, compression, and discharge of the refrigerant gas in the cylinder bore 1b of the cylinder block 1. When the piston 1c comes to an end of every compression stroke thereof, a part of the compressed gas is confined in the cavity defined by the cutaway 21c disposed at a position adjacent to the free end 2aA of the suction valve 2a as a predetermined amount of over-compressed refrigerant gas. Subsequently, when the piston 1c begins the suction stroke thereof after the preceding compression stroke, the over-compressed refrigerant gas within the cavity is expanded and comes out of the cavity as a gas flow, as illustrated by arrows "S" in FIG. 4. This gas flow "S" promotes separation of the free end 2aA of the suction valve 2a from the valve plate 3 which is caused by a pressure difference between pressures in the cylinder bore 1b and the suction chamber 12B. An arrow "F" of FIG. 4 designates the flow of the suction refrigerant gas from the suction chamber 12B toward the cylinder bore 1b during the suction stroke. As a result, a smooth movement of the suction valves 2a of the suction valve sheet 2 from the closed position thereof to the open position thereof is ensured at the initial stage of each suction stroke of the corresponding pistons 1c, irrespective of oil mist between the valve plate face and the suction valves 2a. That is, according to the above-mentioned gas flow, a constant and regular opening motion of the suction valves 2a of the suction valve sheet 2 is carried out without the occurrence of either an unfavorable vibrating motion or an irregular opening motion thereof, and as a result, no pulsation takes place in the suction flow of the refrigerant gas, and no appreciable noise is heard.

According to experiments conducted by the present inventors, when the width "R" of the radial recess 6 is, for example, 3 mm, if the width $L_2$ of each cutaway 21c is made more than 3 mm, it was confirmed that the above-described promotion of the separation of the free ends 2a A of respective suction valves 2a from the valve plate 3 can be achieved during every suction stroke of the reciprocatory pistons 1c. That is, a smooth opening of the suction valves 2a of the suction valve sheet 2 was confirmed.

Figure 5:
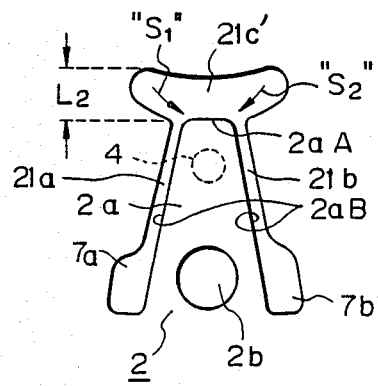
FIG. 5 is a view similar to FIG. 2, and illustrating one of resilient suction valves according to another embodiment of the present invention.
Figure 6:
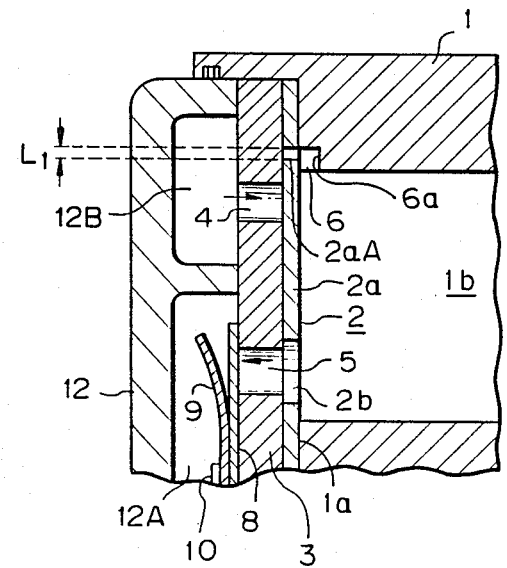
FIG. 6 is a partial cross-sectional view of a reciprocatory piston type compressor incorporating therein a suction valve mechanism according to the prior art.
Figure 7:
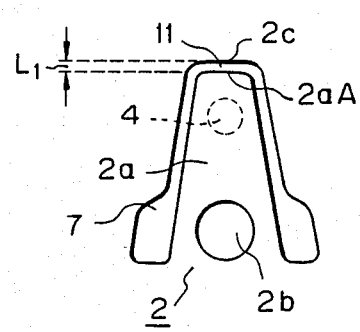
FIG. 7 is a partial side view of a conventional valve sheet accommodated in the compressor of FIG. 6, illustrating one of the resilient suction valves and a cutoff slot.
Figure 8:
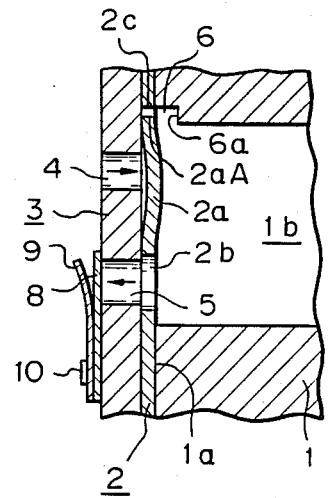
FIG. 8 is a cross-sectional view of a part of the compressor of FIG. 6, illustrating one of the conventional suction valves at a start of the opening thereof; and, FIG. 9 is a cross-sectional view of a part of the compressor of FIG. 6, illustrating one of the conventional suction valves at the open position.
Figure 9:
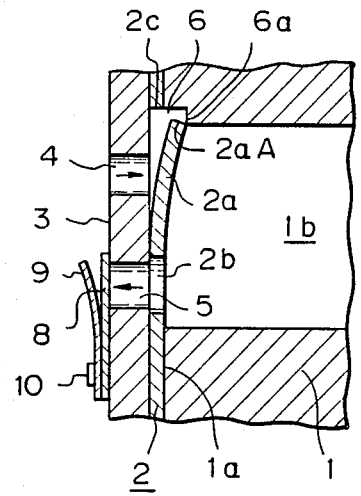

When the embodiment of FIG. 5 is employed, it is possible to generate by-flows $S_1$ and $S_2$ of the gas, which enable the suction valves 2a to be more readily separated from the face of the valve plate 3 to the open position thereof.

From the foregoing description of the embodiments of the present invention, it will be understood that, according to the present invention, since the suction valves of the reciprocatory piston type compressor always carry out a smooth opening of the suction ports of the valve plate, the pulsation in the suction refrigerant gas can be suppressed and, therefore, the occurrence of noise due to the pulsation can be prevented, and thus a quiet operation of the compressor can be obtained. Further, when the compressor of the present invention is accommodated in an air-conditioning circuit of a vehicle, and when the compressor is driven by the engine of the vehicle at a low rotating speed such as an idling speed, the compressor with the suction valve mechanism according to present invention will operate reliably and quietly.

We claim:

1. A reciprocatory piston type compressor for compressing a refrigerant gas comprising:
   a cylinder block having therein a plurality of axial cylinder bores formed as compression chambers for permitting reciprocatory pistons to carry out a suction and compression of refrigerant gas therein;
   at least a housing closing an axial end of said cylinder block for forming a suction chamber for receiving the refrigerant gas before compression and a discharge chamber for receiving the refrigerant gas after compression;
   a valve plate arranged between the axial end of said cylinder block and said housing and having an inlet port for introducing the refrigerant gas to be compressed from an outer air-conditioning circuit into said suction chamber, a plurality of suction ports for fluidly communicating between said suction chamber and said compression chamber, an outlet port for discharging the compressed refrigerant gas from said discharging chamber toward the outer air-conditioning circuit, and a plurality of discharge ports for fluidly communicating between said discharge chamber and said compression chambers;
   a suction valve sheet arranged between one end face of said valve plate and the axial end of said cylinder block, and having a central fixed portion and a plurality of suction valves formed as resilient reed valves radially extending from the central fixed portion and adapted to perform a resilient movement with respect to the central fixed portion between an open position spaced from said valve plate for opening a corresponding one of said suction ports and a closed position being in contact with said valve plate for closing the corresponding suction port in response to suction and compression motions of said reciprocatory pistons, each of said suction valves having substantially radially extending opposite sides and a free end which are surrounded by a continuously extending cutoff slot formed in said suction valve sheet, said free end of each suction valve being restable on a bottom wall of a radial recess formed in said axial end of said cylinder block at a position adjacent to an end of the corresponding cylinder bore when said suction valve is in the open position;

a discharge valve sheet arranged on the other end face of said valve plate and having a base support plate fixed in close contact with said other end face of said valve plate and a plurality of resilient discharge valves able to perform a resilient movement between a closed position in contact with said valve plate for closing a corresponding discharge port in response to the suction and compression motions of said reciprocatory pistons; and, a plurality of means for retaining a predetermined amount of the compressed refrigerant gas at positions adjacent to respective free ends of said suction valves of said suction valve sheet, said plurality of means for retaining a predetermined amount of the compressed refrigerant gas being always communicated with the corresponding cylinder bores via said radial recesses of said cylinder block thereby to permit said predetermined amount of refrigerant gas to flow into said cylinder bores and promote a resilient movement of said suction valves toward said open position during the suction motion of the corresponding reciprocatory pistons, ends of said suction valves comprising a plurality of cutaway portions located adjacent to said respective free ends of said suction valves and formed by widening a part of each of said cutoff slots of said suction valve sheet, each of said cutaway portions being radially wider than a radial length of each said radial recess, and each of said cutaway portions being portions being radially wider than the transverse width of said cutoff slot adjacent said substantially radially extending opposite sides.

2. A reciprocatory piston type compressor according to claim 1, wherein each of said suction valves of said suction valve sheet comprises a radially convergent reed valve extending from said central fixed portion of said suction valve sheet and having a straight front end forming said free end.

3. A reciprocatory piston type compressor according to claim 3, wherein each of said plurality of cutaway portions of said suction valve sheet has the shape of a substantially triangular opening extending radially outward of each said straight free end of said suction valve.

4. A reciprocatory piston type compressor according to claim 2, wherein each of said plurality of cutaway portions of said suction valve sheet has the shape of an elongated and curved opening in juxtaposition with each of said free ends of said suction valves.

* * * * *